United States Patent [19]

Lohr, Jr. et al.

[11] 3,890,260

[45] June 17, 1975

[54] STABILIZED POLYBUTADIENE RESINS

[75] Inventors: Delmar F. Lohr, Jr.; John William Fieldhouse; Edward Leo Kay, all of Akron, Ohio

[73] Assignee: The Firestone Tire & Rubber Company, Akron, Ohio

[22] Filed: Apr. 16, 1973

[21] Appl. No.: 351,690

[52] U.S. Cl............................260/23.7 R; 260/23.7 M; 260/45.75 W
[51] Int. Cl............................................ C08d 11/04
[58] Field of Search .. 260/23.7 R, 23.7 M, 45.75 R, 260/799, 809

[56] References Cited
UNITED STATES PATENTS

| | | | |
|---|---|---|---|
| 2,789,962 | 4/1957 | Groff et al. | 260/45.75 N |
| 3,083,175 | 3/1963 | Safford et al. | 260/45.9 R |
| 3,579,478 | 5/1971 | Dunn et al. | 260/45.75 N |
| 3,658,637 | 4/1972 | Danielson | 260/23.7 M |

FOREIGN PATENTS OR APPLICATIONS 1,227,162   4/1971   United Kingdom............ 260/23.7 R

*Primary Examiner*—V. P. Hoke

[57]         ABSTRACT

The incorporation of a zinc salt of N-substituted-beta-aminoalkylthiol into a polybutadiene resin greatly enhances the resistance thereof to thermo-oxidatise deterioration.

6 Claims, No Drawings

STABILIZED POLYBUTADIENE RESINS

FIELD OF THE INVENTION

This invention relates to butadiene polymer and copolymer resins, and more particularly to increasing the resistance of such resins to deterioration of the mechanical properties upon exposure to heat and air.

BACKGROUND OF THE INVENTION

Butadiene polymer and copolymer resins, particularly those having, in uncured state, a high proportion of butadiene units incorporated in 1,2-configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 600°F. (316°C.), however, the mechanical properties of these resins tend to slowly degrade over a period of time, which excludes them from many applications for which they would otherwise be very suitable. To date, however, there does not appear to have been any successful development of enhanced heat-resistant resins of this type.

Accordingly, it is an object of this invention to increase the resistance of butadiene polymer and copolymer resins to deterioration by heat and air.

Another object is to provide such heat resistant resins which will have physical and chemical properties undiminished in comparison with these resins as heretofore supplied.

A further object is to improve the heat resistance of such resins by incorporating therein modest amounts of compounding ingredients which are inexpensive and readily aviable, and which present no dangers or inconvenience involving toxicity, corrosiveness or the like.

SUMMARY OF THE INVENTION

The above and other objects are secured, in accordance with this invention in compositions comprising:

|  | Parts by Weight |
| --- | --- |
| Polybutadiene or copolymer resin | 100 |
| Zinc salt of N-substituted-beta-aminothiol | 0.5–5.0 |
| A metal soap | 0.5–5.0 |
| The composition being cured by heating with presence of: | |
| A peroxide curing agent | 0.5–6.0 |

The above ingredients are, of course, exclusive of other filling, reinforcing and compounding ingredients such as glass fiber, glass fabric, asbestos, flame resisters, and the like.

DESCRIPTION OF THE PREFERRED EMBODIMENTS

The Polybutadiene Resins

These may be any resins which are based on polymers of butadiene or copolymers of butadiene with up to 60 percent, based on the copolymers, of styrene. Also minor proportions, say up to 15 percent based on the copolymer of other ethylenically unsaturated compounds may be incorporated in the copolymers. These resins are usually prepared by (co) polymerizing the monomers by means of free radical or anionic catalysts to a relatively low molecular weight, say 1000–200,000, so that they are of at least a flowable consistency. These low molecular weight (co) polymers are then incorporated with any desired fillers, reinforcing fibers or fabrics, pigments, etc., peroxide or other curing agents if desired, etc., and the composite is cured under heat and pressure to produce the desired finished article.

More particularly, there have recently been developed a class of polybutadiene resins having at least 40 percent, and preferably at least 60 percent by weight, of butadiene in the polymer molecule, and having at least 80 percent by weight of the butadiene therein in the vinyl type of butadiene repeating unit structure. The average molecular weight (determined by intrinsic viscosity measurement) is at least 12,500 and the molecular weight distribution is such that at least 50 percent, and preferably 90 percent, of the polymer has a molecular weight above 10,000 and at least 95 percent has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25°C. or about 0.68 taken at 30°C. The resin should also have a dilute solution viscosity of 0.2–0.7, preferably 0.3–0.6. The butadiene units are incorporated into the polymeric chain largely in the 1,2-configuration, preferably at least 80 percent of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO$. where R independently in each occurrence represents a hydrocarbon radical of 1–20 carbon atoms), and heating the polymers, usually under pressure. The curing temperature is advantageously at least 250°F. (121°C.), preferably about 300°–350°F. (149°–177°C.). Generally, no advantage in the process or product is obtained by exceeding a temperature of 420°F. (216°C.). Obviously, the higher temperature the shorter will be the curing time required. Generally at 350°F. (177°C.) a satisfactory cure is obtained in less than four minutes, and in some cases even within a few seconds. Cure times of more than four minutes usually provide no added advantage. Where fast cures are desired, it is necessary to use a filler to avoid crazing or cracking. A filler, such as silica, is advantageously used in the proportion of 25–65, preferably 40–60, volume per cent based on the combined resin-filler composition. Also the resins may be incorporated with glass fiber, either as chopped filler or else as glass fabric in a liminate, in which case the glass fiber will serve the purpose of a filler in preventing crazing and cracking on fast cures.

More particularly with regard to the inclusion of fillers, the present invention is of particular advantage in the stabilization of compositions containing silica fillers in amounts of 100 to 500 parts by weight per 100 parts by weight of butadiene polymer or copolymer. In such cases it is desirable to include 0.05 to 2.0 parts per 100 parts of silica of an agent for bonding the filler to the polybutadiene resin such as an unsaturated-group-containing silane on the order of vinyl triacetoxysilane, vinyl tributoxy silane, vinyl trimethyoxysilane, and vinyl triethoxysilane.

The Metal Soap

This may be any metal salt and preferably a Group II-A or II-B metal salt of an organic acid containing from 8 to 26 carbon atoms such as calcium 2-ethylhexanoate, calcium octoate, calcium laurate, calcium myristate, calcium stearate, calcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like, and mixtures of any two or more of such salts in any proportions.

Zinc Salts of N-Substituted-Beta-Aminoalkylthiols

The zinc salts of N-substituted-beta-aminoalkylthiols may be represented by the following general formula

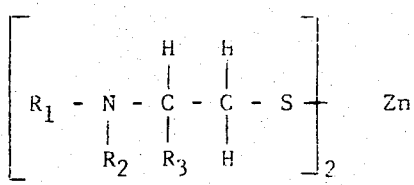

where $R_1$ and $R_3$ may be hydrogen atoms or alkyl groups containing one to about sixteen carbon atoms. $R_2$ is preferred to be a phenyl group or a substituted phenyl group.

The zinc salts of the beta-aminothiols can be prepared by reaction of an aromatic amine with an alkylene sulfide followed by neutralization with zinc hydroxide or oxide.

Based on cost and availability of raw materials, one preferred antidegradant used in our invention is the zinc salts of N-phenyl-2-aminoethanethiol which is derived from aniline, ethylene sulfide and zinc oxide.

Another preferred antidegradant is based on N-phenyl-p-phenylenediamine reaction with ethylene sulfide and zinc oxide; namely, zinc bis [N-phenyl-N'-(ethyl-2-mercaptide)-p-phenylenediamine].

For clarity and brevity of presentation, the structural formulas are presented below and reference to the preferred compounds will be referred to in the following Table as Formula I and Formula II.

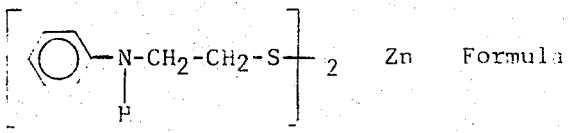

Zinc bis(N-phenyl-2-aminoethanethioate)

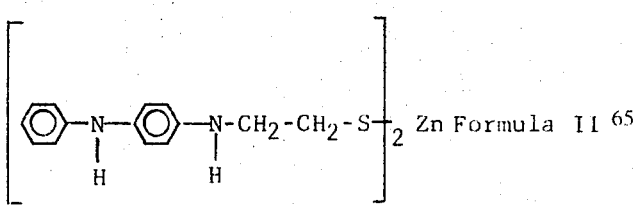

Zinc bis[N-phenyl-N'-(ethyl-2-mercaptide)-p-phenylenediamine.

It will be obvious to those skilled in the art that propylene sulfide or n-butylene sulfides (one or two isomer) could be used in place of ethylene sulfide. In addition, N-alkyl-substituted p-phenylenediamines could be used with good results instead of N-aromatic-p-phenylenediamines. Various alkyl-substituted anilines will also be effective. We believe that all compounds which are in accord with the general formula presented previously will function as antidegradants in our invention.

The Cured Resins

The cured resins produced in accordance with this invention have exceptional resistance to thermo-oxidatide deterioration of physical properties, particularly modulus and flexural strength, upon long time exposure at high temperatures, i.e., temperatures above 400°F. and up to 700°F. Thus, the products, upon exposure to a temperature of 600°F. for 100 hours, will retain upwards of 80 percent their modulus and upwards of 60 percent of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages given are on the basis of weight, unless otherwise explicitly stated.

EXAMPLE I

|  | Parts by Weight |
|---|---|
| Polybutadiene* | 100 |
| Silica | 380 |
| Vinyl triacetoxysilane | 3 |
| Dicumyl peroxide | 3 |
| Hexane | 150 |
| Calcium stearate | (per Table 1) |
| Zinc salt of N-substituted-beta-aminoethanethiol | (per Table 1) |

*90% of butadiene units in 1,2-configuration; molecular weight parameters $M_w$ = 29,000, $M_n$ = 23,000, DSV = 0.3

A series of compositions was made in accordance with the above schedule, varying the calcium stearate and the thioates in the several compositions as indicated in the table which follows. In the case of each composition, all of the ingredients, in the proportions selected for that composition, were thoroughly mixed together, and the mixture poured into an evaporating dish to the depth of 0.5 inch. The dish was then placed in a vacuum oven, where the hexane was removed at 125°F. under a pressure of 1–5 mm. of mercury absolute. Each such dried composition was then removed and broken up, and molded in a compression mold into several test bars 1 inch × 3 inches × 0.1 inch. Temperature of molding was 350°F., total load on the die was 10–20 tons normal to the 1 inch × 3 inches face, and time was four minutes. The modulus and flexural strength was determined upon control bars from each composition, and the average recorded in the table.

The incorporation of hexane in the mix was a matter of convenience for preparing relatively small samples in the laboratory. On an industrial scale, the components of the mixture could be mixed without hexane solvent as a matter of economics.

TABLE I

STABILIZING EFFECTS OF ZINC N-SUBSTITUTED-BETA-AMINOALKYLTHIOLATES
Forced-Air Oven Aging At 600°F., 100 Hours

| Test Sample | Flexural Modulus psi X10$^{-6}$ | | | Flexural Strength, psi | | |
|---|---|---|---|---|---|---|
| | Unaged | Aged | % Retained | Unaged | Aged | % Retained |
| 1. Control, no stabilizer | 1.31 | 0.12 | 9 | 11,100 | 1,100 | 10 |
| 2. Control plus Ca Stearate, 3.0 phr | 1.40 | 1.11 | 79 | 10,700 | 7,200 | 67 |
| 3. Sample No. 2 plus 1.0 phr of | | | | | | |
| Formula I | 1.43 | 1.25 | 87 | 10,800 | 9,700 | 90 |
| Formula II | 1.25 | 1.16 | 93 | 12,300 | 9,300 | 76 |

As shown by the data summarized in the table, the control sample with no antidegradant retained about 10 percent of its original flexural modulus and strength after aging 100 hours at 600°F. in a forced-air oven.

In contrast, the incorporation of 3.0 phr of calcium stearate effected an increase in modulus and tensile retention after aging to 79 percent and 67 percent, respectively. An additional increase of flexural modulus and strength retention was obtained with the zinc beta-aminoalkylthiolates of our invention. At only 1.0 phr, zinc bis(N-phenyl-2-aminoethanethioate); Formula I, increased the flexural modulus retention to 87 percent and flexural strength retention to 90 percent. At a 1.0 phr level, zinc bis[N-phenyl-N'-ethyl-2-mercaptide)-p-phenylenediamine]; Formula II, increased flexural modulus retention to 93 percent. Flexural strength retention was 76 percent which compares favorably with sample No. 1, the control, as well as with sample No. 2.

What is claimed is:

1. A composition curable to a hard resin having enhanced resistance to thermo-oxidative deterioration, which composition comprises

| | Parts by Weight |
|---|---|
| A butadiene homopolymer or copolymer resin | 100 |
| Vinyltriacetoxysilane | 0.05-5.0 |
| Silica | 100-500 |
| Zinc bis(N-substituted-beta-aminoethanethioate) | 0.5-5.0 |
| Calcium stearate | 0.5-5.0 |
| A peroxide curing agent | 0.5-6.0 | the N-substituent being phenyl or N-phenyl-4-aminophenyl, and the resin being a homopolymer of butadiene or a copolymer of butadiene and styrene and containing at least 40 percent by weight of butadiene, and at least 80 percent of butadiene repeating units in the homopolymer being in the 1,2-configuration; the curing agent being a peroxide which gives radicals of the structure $R_2(CH_3)CO$. in which each R represents a hydrocarbon radical containing 1 to 20 carbon atoms.

2. Composition according to claim 1, wherein the N-substituent is aniline.

3. Composition according to claim 1 wherein the zinc salt is zinc bis[N-phenyl-N'-(ethyl-2-mercaptide)-p-phenylenediamine].

4. A peroxide-cured resin highly resistant to thermooxidative deterioration of physical properties, said resin containing therein

| | Parts by Weight |
|---|---|
| A butadiene homopolymer or copolymer resin | 100 |
| Vinyltriacetoxysilane | 0.5-5.0 |
| Silica | 100-500 |
| Zinc bis(N-[substituted-beta] phenyl-2-aminoethanethioate) | 0.5-5.0 |
| Calcium stearate | 0.5-5.0 | the substituent being aniline or paraphenylenediamine and the resin being a homopolymer of butadiene or a copolymer of butadiene and styrene and containing at least 40 percent by weight of butadiene, and at least 80 percent of butadiene repeating units in the homopolymer or copolymer being in the 1,2-configuration, the resin having been cured by a peroxide which gives radicals of the structure $R_2(CH_3)CO$. in which each R represents a hydrocarbon radical containing 1 to 20 carbon atoms.

5. Cured resin according to claim 4, wherein the zinc salt is bis(N-phenyl-2-aminoethanethioate).

6. Cured resin according to claim 4, wherein the zinc salt is zinc bis[N-phenyl-N'-(ethyl-2-mercaptide)-p-phenylenediamine].

* * * * *

PO-1050
(5/69)

UNITED STATES PATENT OFFICE
CERTIFICATE OF CORRECTION

Patent No. 3,890,260                    Dated  June 17, 1975

Inventor(s)  Delmar F. Lohr, Jr., John W. Fieldhouse, Edward L. Kay

It is certified that error appears in the above-identified patent and that said Letters Patent are hereby corrected as shown below:

On first page, under Abstract, third line, "thermo-oxidatise" should be -- thermo-oxidative --

Column 2, line 61, "liminate" should be -- laminate --.

Column 4, lines 16 & 17 - "thermo-oxidatide" should be -- thermo-oxidative --

Column 5, line 3 "economics.n" should be -- economics. --
Column 6, Claim 2 should be corrected to read as follows:

2. Composition according to claim 1 wherein the zinc salt is zinc bis(N-phenyl-2-aminoethanethioate).

Signed and Sealed this fourteenth Day of October 1975

[SEAL]

Attest:

RUTH C. MASON
*Attesting Officer*

C. MARSHALL DANN
*Commissioner of Patents and Trademarks*